United States Patent Office 2,991,383
Patented July 4, 1961

2,991,383
TRI-COLOR PHOSPHOR SCREENS OF THE MOSAIC VARIETY
Austin E. Hardy, Lancaster, Pa., assignor to Radio Corporation of America, a corporation of Delaware
No Drawing. Filed Jan. 5, 1959, Ser. No. 784,893
3 Claims. (Cl. 313—92)

My invention relates to color-kinescopes and has special reference to improvements in tri-color phosphor screens of the mosaic variety, for use in such kinescopes.

One of the severest performance tests of a tri-color kinescope involves its ability faithfully to reproduce the black-and-white pictures of a monochrome broadcast. Although present day color-kinescopes are entirely capable of handling both color and black-and-white pictures the pictures reproduced on the screens of such color-tubes in response to black-and-white picture signals are by no means as bright as those provided by a conventional monochrome (zinc cadmium sulfide) television screen operating with the same electrical power input.

Accordingly, an object of my invention is to provide an improved tri-color phosphor screen and one characterized by its ability to produce black-and-white pictures of substantially greater brightness than those provided by present day color-phosphor screens operating at the same electrical power input Another and important object of my invention is to achieve the foregoing object in a tri-color screen without any sacrifice of contrast and light-output when the screen is called upon to reproduce pictures in full color.

Yet another object of my invention is to provide a tri-color phosphor screen which, in addition to the foregoing advantages, shall be substantially free of "color-trailing."

Stated generally, the foregoing and related objects are achieved, in accordance with my invention, by the provision of a tri-color phosphor screen wherein the green elementary areas of the phosphor mosaic, and preferably the blue and red phosphor areas as well, are of the sulfide variety.

In the above connection, it will be recalled that most three-color mosaic screens employ the green emitting zinc ortho-silicate manganese-activated phosphor as the green primary. This more or less "standard" green phosphor has an intrinsic efficiency of between 6 and 7 candle-power per watt (measured in a color tube of the 21AXP22 and 21CYP22 types, as manufactured by RCA), and has C.I.E. color coordinates of $X=0.207$ and $Y=0.711$, which give a dominant wavelength of 535 millimicrons at 82% saturation. The green phosphor preferably employed in the practice of my invention is from the zinc cadmium sulfide silver-activated family and has C.I.E. color coordinates of about $X=0.264$ and $Y=0.611$. Its dominant wavelength is about 540 millimicrons at 66% saturation. Thus, contrary to the present trend in the art to which my invention appertains, the green phosphor which I employ is less saturated, colorimetrically, than the phosphor which it replaces. However, I have discovered that the lower saturation of the sulfide is an advantage in that color-screens made with the green sulfide consistently exhibit more than 20% increase in white-light output. I attribute this improvement in screens made in accordance with my invention to the fact that the sulfide in addition to contributing green to the mixture of colors (required to produce white light) also adds some blue and red radiation to the mixture. Thus, the screen of my invention requires less electrical power (beam-current and voltage) to produce white light, of any given brightness, than present-day color-screens. By way of example: with an applied screen potential of 25,000 volts, the beam-currents required to produce 8 foot-lamberts screen brightness in a tri-color kinescope of a type (RCA 21CYP22) now commercially available, and in a duplicate tube wherein the green phosphor was of the sulfide variety dictated by the present invention are:

| Color | Prior Art Screen, μA. | This Invention, μA. |
|---|---|---|
| Red | 216 | 170 |
| Blue | 77 | 58 |
| Green | 131 | 108 |
| White | 424 | 333 |

The blue phosphor and the red phosphor of the tri-color screens in both tubes of the foregoing example were: silver activated zinc sulfide and manganese activated zinc ortho-phosphate, respectively. The green phosphor in the "prior art screen" was manganese activated zinc ortho-silicate and the green phosphor on the screen of the subject invention was silver activated zinc cadmium sulfide. Close inspection of the pictures produced on both screens revealed a small (tolerable) degree of color-trailing in each, when a white object was moved across the scene being televised. The color-trailing exhibited by the screen of the prior art was yellow and that exhibited by the new screen was red. Thus, the use of the new green phosphor, in an otherwise conventional tri-color screen, eliminated the green component of the yellow-trailing exhibited by the conventional screen.

As set forth in the fifth paragraph of this disclosure, one of the objects of my invention is to provide a tri-color phosphor screen which, in addition to its other advantages, previously mentioned, shall be substantially free from color-trailing. As indicated in the preceding paragraph, this particular object is not achieved, at least to the desired degree, simply by substituting the sulfide green phosphor dictated by my invention, for the orthosilicate green of a conventional tri-color screen. Something more is required.

The "something more" that I have found necessary to the elimination of color-trailing in a tri-color screen, of the mosaic variety, involves a novel combination of elementary screen areas constituted of sulfide-green, with elementary screen areas constituted of sulfide-red and elementary screen areas constituted of sulfide-blue. Thus, in the "all sulfide" phosphor screen which I have selected for illustration, the elementary areas of the mosaic are as follows:

G (green) = silver activated zinc cadmium sulfide wherein the ratio by weight of zinc to cadmium is about 1.9:1 and which contains about 0.002% by weight of silver activator.

R (red) = silver activated zinc cadmium sulfide wherein the ratio by weight of zinc to cadmium is about 0.21:1 and which contains about 0.002% by weight of silver activator.

B (blue) = a phosphor selected from the class consisting of zinc sulfide and containing about 0.005 to 0.025% by weight of silver activator.

The substantially complete freedom from color-trailing in the "all sulfide" screens of my invention may be accounted for by the fact that the red, blue and green phosphors, above specified, have substantially the same light-decay characteristics when electron excitation ceases.

In conclusion, attention is called to the fact that unlike the green and blue phosphors in the foregoing example, the red phosphor (i.e., silver activated zinc cadmium sulfide) is highly resistant to petetration by (ultra violet) rays of the wave length (say 2500–4500 A.) commonly employed in the so-called "direct photographic method" of laying down the elementary areas of the mosaic upon its base-plate. Accordingly, to minimize exposure time, instead of mixing the red-phosphor particles with the photosensitive material (e.g., sensitized polyvinyl alcohol) prior to making the exposure, through this red mask, the phosphor may be applied to the photosensitive material after its exposure, for example, by "dusting" or by "settling" the particles onto the (tacky) elementary areas of which the photograph is comprised.

What is claimed is:

1. An electron-sensitive tri-color screen of the mosaic variety comprising a base-plate having red, blue and green phosphor covered elementary areas disposed in a systematic pattern on the target surface thereof and adapted to produce white light upon simultaneous bombardment of all three phosphors of any group with electrons of predetermined velocities, the green phosphor in said pattern consisting essentially of silver activated zinc cadmium sulfide wherein the ratio by weight of zinc to cadmium is about 1.9:1 and which contains about 0.002% by weight of silver activator, whereby said phosphor in addition to contributing green to the mixture of colors required to produce said white light also adds sufficient blue and red radiation to the mixture such that the number of the electrons bombarding said red and blue phosphors during the production of said white light is less than is required in the production of white light from a similar screen wherein the green phosphor contributes substantially no red and blue radiation to said mixture.

2. The invention as set forth in claim 1 and wherein the red phosphor in said pattern consists essentially of silver activated zinc cadmium sulfide wherein the ratio by weight of zinc to cadmium is about 0.21:1 and which contains about 0.002% by weight of silver activator.

3. The invention as set forth in claim 1 and wherein the blue phosphor in said pattern consists essentially of silver activated zinc sulfide containing about 0.005 to 0.025% by weight of silver activator.

References Cited in the file of this patent

UNITED STATES PATENTS

| | | |
|---|---|---|
| 1,988,605 | Michelssen | Jan. 22, 1935 |
| 2,452,522 | Leverenz | Oct. 26, 1948 |
| 2,802,753 | Crosby et al. | Aug. 13, 1957 |

OTHER REFERENCES

Leverenz: "Luminescence of Solids," 1950, Table 21 between pages 428 and 429.

Copenhafer: "Three-Color Radar Screen," R.C.A. TN. No. 50, received Aug. 12, 1957.